United States Patent [19]
Jones et al.

[11] 3,760,764
[45] Sept. 25, 1973

[54] CAMPER BOAT APPARATUS

[76] Inventors: William W. Jones, 4935 N. Palm Ave., Orlando, Fla. 32807; Frank D. McCaulley, 844 E. Church, Longwood, Fla.

[22] Filed: Feb. 28, 1972

[21] Appl. No.: 229,783

[52] U.S. Cl.................................. 115/1 R, 9/1 T
[51] Int. Cl............................................. B60f 3/00
[58] Field of Search .................. 9/1 T, 1 R; 115/1 R; 114/.5 F

[56] References Cited
UNITED STATES PATENTS

| | | | |
|---|---|---|---|
| 3,090,975 | 5/1963 | Franks................................ | 9/1 T |
| 3,091,208 | 5/1963 | Copeland et al. .................. | 9/1 T |
| 3,172,134 | 3/1965 | Livingstone........................ | 9/1 T |
| 3,414,916 | 12/1968 | Martin et al. ...................... | 9/1 T |
| 3,522,967 | 8/1970 | Platt................................... | 9/1 R X |

Primary Examiner—George E. A. Halvosa
Attorney—Duckworth and Hobby

[57] ABSTRACT

A camper boat apparatus having a camper body for placement on a vehicle such as a pickup truck is provided having means for readily removing the camper from the vehicle. A pair of pontoons is connected to the camper body by hinged arms that allow the pontoons to swing down into one position for use of the camper body as a pontoon houseboat and to swing up into a second position where they are locked and held away from interference with the use of the camper body on the land vehicle.

6 Claims, 8 Drawing Figures

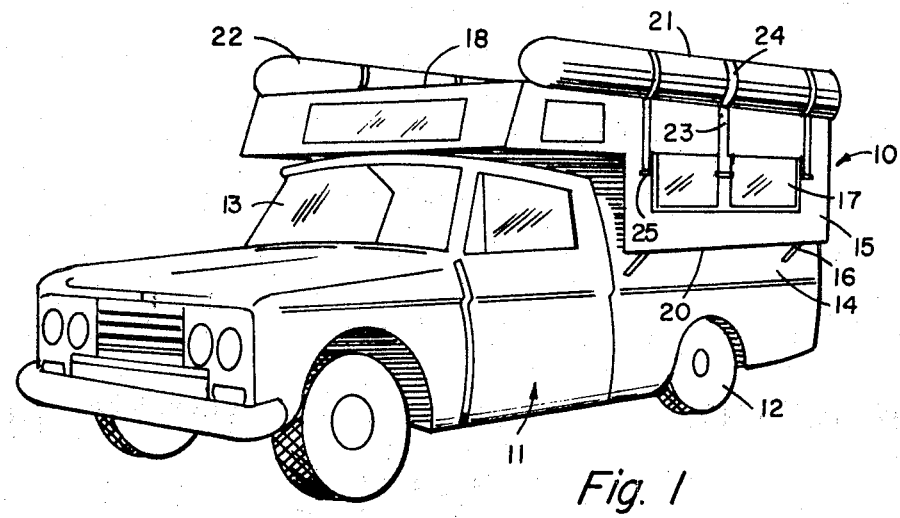
Fig. 1
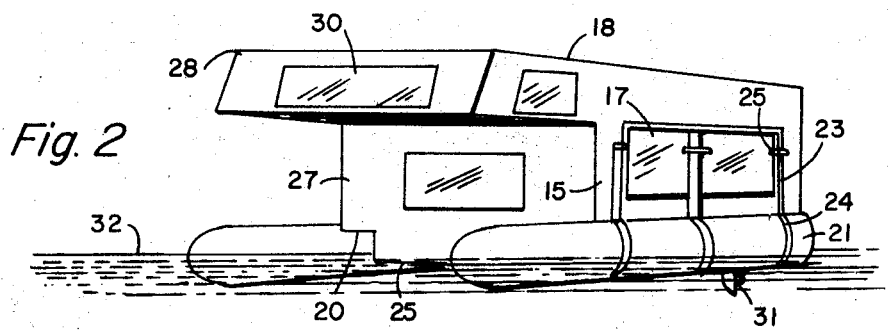
Fig. 2
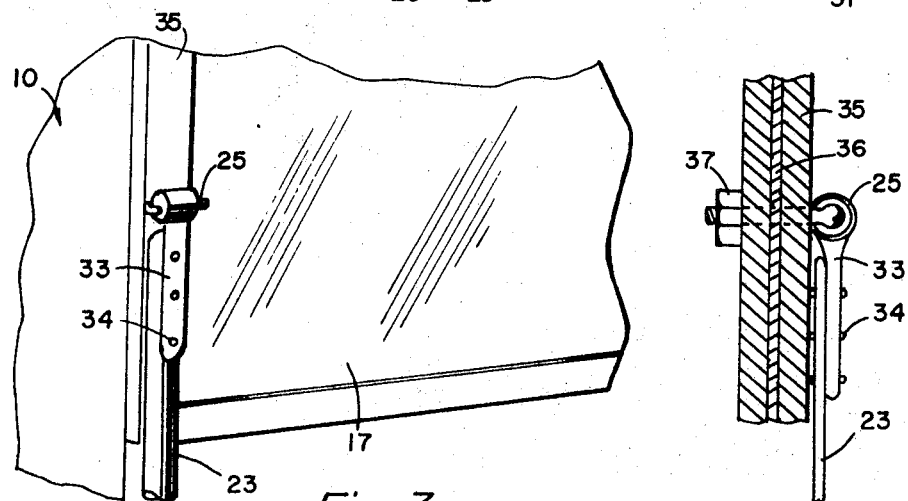
Fig. 3
Fig. 4

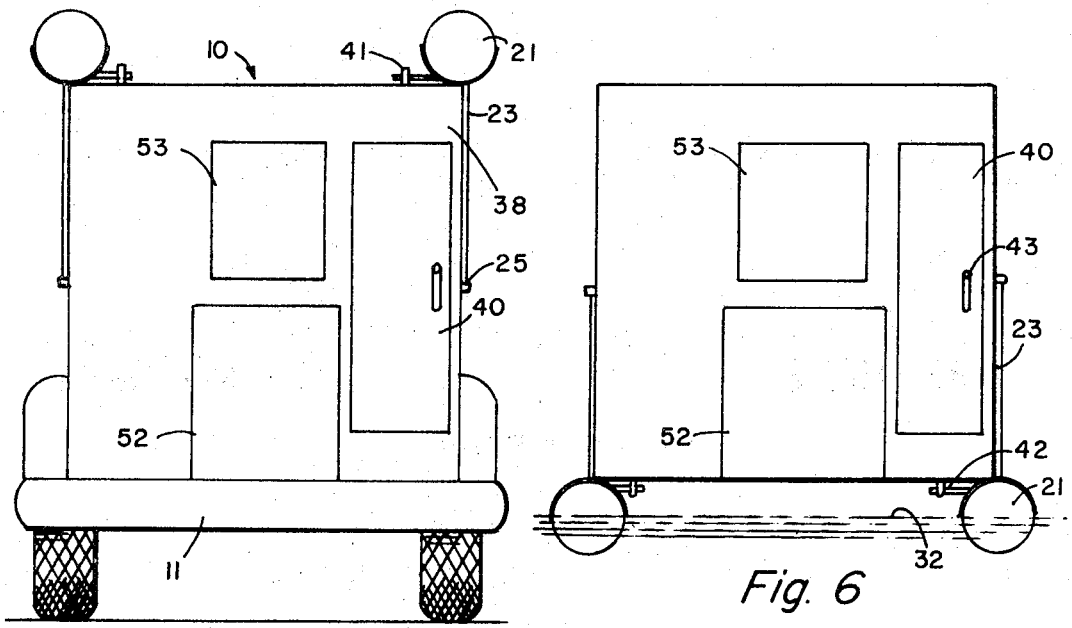
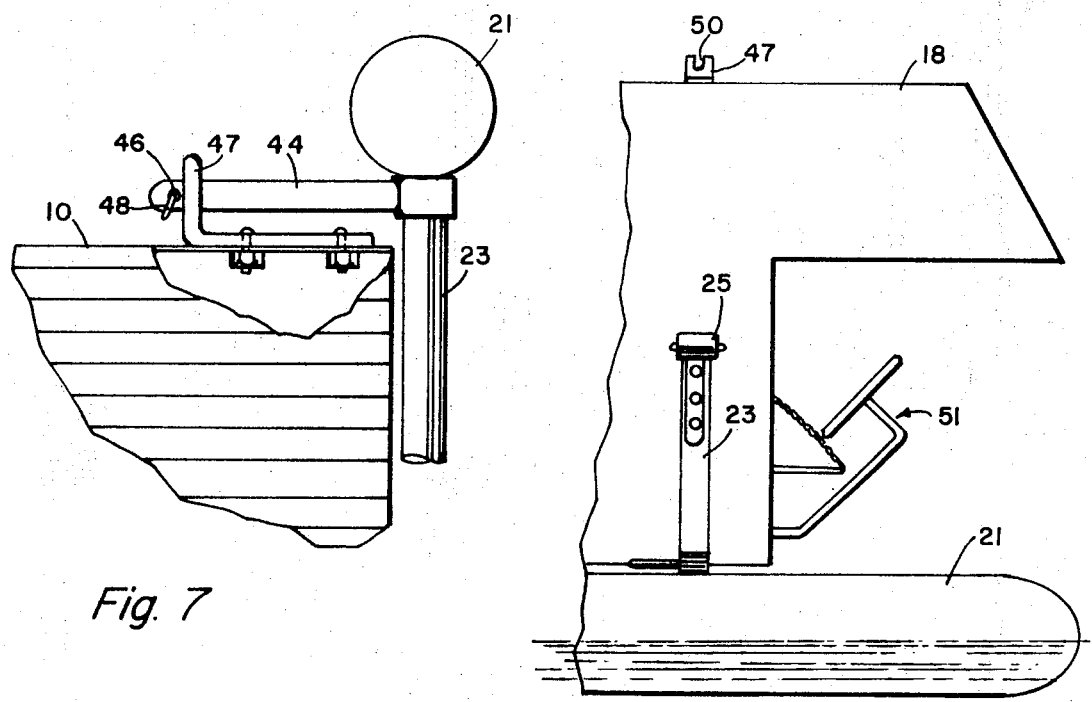

CAMPER BOAT APPARATUS

BACKGROUND OF THE INVENTION

The present invention relates to vehicle campers, such as are frequently placed on pickup trucks, or the like, and especially to vehicle camper which is adapted to be converted to a pontoon type boat for use as a houseboat, or the like, and which may be easily converted and moved from the land vehicle to the water.

In th past many types of camper bodies have been provided and these frequently are made to fit into the back of pickup trucks, but may also be designed for sedan or other type vehicles, as desired. These prior art vehicles have been used by campers for sleeping and cooking in while on vacation trips, and may also be used to provide a large covered area for storage in a vehicle. The prior art has also suggested producing trailer-boat combinations in which the trailer may act as a boat by removing the legs away from the sides of the boat, and various combinations for loading boats on trailers and on trailer campers have also been suggested. U. S. Pat. No. 3,522,967 shows a pickup truck type camper which is convertible to a boat by lifting the camper off the truck and turning it upside down allowing the top of the camper to become the hull of the boat. This type of camper houseboat combination is difficult to unload off of a vehicle and place in the water because of the necessity of turning it upside down. The turning upside down of the camper also necessitates removing of anything located in the camper and prevents having fixed beds, tables, and the like, since they would be upside down when the camper body were turned over to act as a boat.

Accordingly, one object of the present invention is to overcome prior art disabilities and provide a camper that can be easily removed from a land type vehicle fully loaded with beds, tables, cooking stove, and the like, if desired, and which may be easily converted into a pontoon-type houseboat by swinging a pair of pontoons from the top portion of the camper body to the bottom portion and locking them in that position prior to placing in the water.

SUMMARY OF THE INVENTION

The present invention relates to a camper and camper-boat combination having a camper body removably attachable to a vehicle for traveling over land, such as a pickup truck. A plurality of swingable arms, bars, rods, or the like, can be hinged at one end to the camper body for swinging relative to the camper body. Floatable pontoons are attached to the swinging arms such as by metal bands wrapped around the pontoons and attached to the swinging arms and adapted to be swung in that position at the upper end of the camper body and locked or fastened in that position for use of the camper on a land vehicle and to be swung to a low position when the camper body is removed from the vehicle and locked in that position to act as pontoons for a boat when the camper is used on a body of water. The pontoons can be adapted to swing approximately half way over the top and half way under the bottom of the camper in the two positions, and the camper may include means for attaching the outboard motor when used as a boat, and may have windows, doors, and the like. The camper would normally be reinforced at those points at which the pontoons are hinged and as many swinging arms as desired can be utilized. Thus the pontoons are held in two directions when used as a boat, first by the arms which would generally be in a substantially vertical direction, and then by the locks for locking in position, which generally hold the pontoons in a horizontal direction.

BRIEF DESCRIPTION OF THE DRAWINGS

Other objects, features and advantages of this invention will be apparent from a study of the written description and the drawings, in which FIG. 1 shows a perspective view of a camper boat in accordance with the present invention placed upon a pickup truck;

FIG. 2 shows a perspective view of the camper boat in accordance with FIG. 1 being utilized as a houseboat with the pontoons in a second position;

FIG. 3 illustrates a cutaway perspective view of the arm hinge on the side of the camper;

FIG. 4 illustrates a perspective cutaway view of the hinge in accordance with FIG. 3;

FIG. 5 is a rear elevation view of the embodiment of FIG. 1 shown placed on a vehicle;

FIG. 6 is a rear elevation view of the embodiment as illustrated in FIG. 2;

FIG. 7 is a cutaway sectional view of one corner of the camper body having the pontoon anchored to the top of the camper body; and FIG. 8 is a sectional view of the front of the camper as illustrated in FIG. 2.

DESCRIPTION OF THE PREFERRED EMBODIMENT

Referring now to FIG. 1, a camper body 10 in accordance with the present invention is illustrated atop of a pickup truck 11 having wheels 12, a cab portion 13 and a rear open loading portion 14. The camper body 10 has sides 15 strapped to the vehicle 11 by straps 16 and has windows 17 in the sides thereof. The camper body 10 has a top 18 and a first bottom portion 20 which overlaps the sides of the rear portion of the pickup truck 11. A pair of pontoons 21 and 22, each having a generally bullet shape, are connected to the camper body 10 by a plurality of arms 23 which are connected to metal straps 24 wrapped around and holding pontoons 21. The arms 23 are hinged at 24 to the sides of the camper 10 allowing the arms 23 and the pontoons 21 to swing on the hinges 24.

FIG. 2 shows the camper body of FIG. 1 having the pontoons 21 swung into a second position partially under the first bottom 20 of the camper body. The camper body also has a main floor 26. This view also illustrates the metal bands 24 along with the arms 23 movably held by the hinges 25, the top of the camper body 18, along with the windows 17 and the sides of the camper body 15. As can also be seen in this view, the camper body has a front portion 27 with a protruding front portion 28, with the protruding portion normally being set up inside to act as a double bed, and having windows 30. In the boat shape, and outboard motor shaft and propeller 31 can be seen protruding below the boat for propelling the houseboat through the water, as will be described in more detail. The pontoons are locked in either the upper or lower position for use as a houseboat in the lower portion or for being held out of the way when the camper body is used on a land vehicle 11. The pontoons 21 are illustrated as floating on a body of water 32.

Referring now to FIG. 3, the arm 23 can be of bar stock or metal rods, angle or channel steel or any extending structure desired, and is hinged with a hinge 25 having a fastening structure 23 for fastening the rod 23 to the hinge 25 by bolts or rivets 34. The hinge 25 is attached to a reinforcing post 35 on the camper body 10 and one of the side windows 17 is illustrated attached thereto.

FIG. 4 illustrates another view of the hinge 25 showing it as having bolt members 36, which in this case are illustrated as one U-bolt extending out of the reinforced corner 35 and being bolted with a nut 37. The strap portion 33 is bolted to the arm 23 by bolts 34.

Referring now to FIG. 5, the camper body 10 is illustrated on the vehicle 11 and has a rear portion 38 and a door 40 for entering the camper from the rear. The pontoons 21 along with the arms 23 hinged at 25 may also be seen in this view along with the attaching or locking means 41.

FIG. 6 illustrates the same rear view with the pontoons 21 riding in a body of water 32 and latched at the bottom by bottom locking member 42. The door 40 has a door handle 43 for opening and closing the door and the pontoons 21 are shown held by arms 23 as well as by the locking mechanism 42.

FIG. 7 more clearly illustrates one means of locking the arms 23 with pontoons 21 thereon to the upper portion of the camper 10 and has protruding arms 44 which rotate on arms 23 for use in upper or lower portions of the pontoons and each arm 44 has an opening 46 therein so that when the pontoon 21 swings on the arm 23 the bar 44 slides into a slot in a bracket 47 and may be pinned or locked through the hole 46 with a locking pin 48. The arm 45 is of course used to lock the pontoon 21 on the bottom of the camper body in a manner similar to the upper locking mechanism.

It should of course be made clear at this point that other locking mechanisms may be utilized to lock the pontoon in different positions, without departing from the spirit and scope of the present invention.

FIG. 8 shows the camper body 10 used as a boat, having upper catch member 47 with a slot 50 therein and the arm 23 hinged at 25 to camper body 10 and connected to pontoon 21 which is locked in its bottom position. A steering mechanism 51 is illustrated in the front of the boat for guiding the boat which may be driven by an outboard motor placed on the back of camper body in a protruding well 52, which may be seen in FIGS. 5 and 6. Rear windows 53 of FIGS. 5 and 6 also may be opened for reaching the outboard motor while the houseboat is in the water.

It should be clear at this point that a camper which is adapted to be converted to a houseboat has been illustrated, but it should also be clear that other embodiments are contemplated such as using different types of campers and camper bodies and different types of floatable pontoons and material in converting the camper from a land vehicle to a water vehicle, without departing from the spirit and scope of the invention. An advantage of the present invention is the ease with which the camper may be removed from a land vehicle and converted to a boat in an inexpensive manner, and prevents having to haul both a camper and a boat when traveling such as on vacation, in addition to the great expense of purchasing and maintaining both.

Accordingly, this invention is not to be construed as limited to the particular forms disclosed herein since these are to be regarded as illustrative rather than restrictive.

We claim:

1. A camper boat apparatus comprising in combination:
   a. a camper body removably attachable to a land vehicle;
   b. a plurality of swingable arms hinged at one end of each said arm to said camper body for swinging relative to said camper body;
   c. floatable pontoon means attached to the other end of said swingable arm means and adapted to swing therewith each said pontoon being swingable partially under said camper body in one position and swingable partially over said camper body in a second position, and each said pontoon being fastened to said swingable arms with metal bands wrapped around each pontoon and attached to said swingable arms;
   d. fastening means for locking said swingable arms in at least one position to said camper body for holding said pontoon means in position to float said camper body when placed in water whereby a camper body acts as a boat; said fastening means including means for locking said swingable arms in a second position to said camper body for changing the location of said pontoon means when said camper body is placed upon a land vehicle; and
   e. a plurality of locking arms rotatably connected to said swingable arms and located adjacent said pontoons for locking said swinging arms to a plurality of brackets on said camper body for holding said swingable arms and pontoons in position, said locking arm engaging brackets on top of said camper body in one position and engaging brackets on the bottom of said camper body in a second position when said locking arms are rotated approximately 180° from said one position.

2. The apparatus according to claim 1 in which said pontoon means includes two pontoons, one located on either side of camper body and each connected to said camper body by a plurality of swingable arms hinged to said camper body.

3. The apparatus according to claim 1 in which said camper body includes means for attaching an outboard motor thereto for propelling said camper body on said pontoons through the water.

4. The apparatus according to claim 3 including attaching means for removably attaching said camper body to a land vehicle.

5. The apparatus according to claim 4 in which said camper body is reinforced at locations where said swingable arms are attached thereto.

6. The apparatus according to claim 4 in which said camper body includes windows and a door therein.

* * * * *